US005313232A

United States Patent [19]

Peer

[11] Patent Number: 5,313,232

[45] Date of Patent: * May 17, 1994

[54] METHOD OF JETTING PHASE CHANGE INK

[75] Inventor: Thomas R. Peer, Londonderry, N.H.

[73] Assignee: Dataproducts Corporation, Woodland Hills, Calif.

[ * ] Notice: The portion of the term of this patent subsequent to Feb. 12, 2008 has been disclaimed.

[21] Appl. No.: 987,100

[22] Filed: Dec. 7, 1992

Related U.S. Application Data

[60] Continuation of Ser. No. 606,732, Oct. 31, 1990, abandoned, which is a division of Ser. No. 131,318, Dec. 8, 1987, Pat. No. 4,992,806, which is a continuation of Ser. No. 830,345, Jan. 17, 1986, abandoned.

[51] Int. Cl.[5] .......................... G01D 15/16; B41J 2/17

[52] U.S. Cl. ................................................ 346/140 R

[58] Field of Search ............. 346/140 R, 140 PD, 1.1; 400/126

[56] References Cited

U.S. PATENT DOCUMENTS

| | | | |
|---|---|---|---|
| 4,666,757 | 5/1987 | Helinski | 346/135.1 |
| 4,741,930 | 5/1988 | Howard et al. | 346/1.1 |
| 4,992,806 | 2/1991 | Peer | 346/140 R |

*Primary Examiner*—Mark J. Reinhart

*Attorney, Agent, or Firm*—Spensley Horn Jubas & Lubitz

[57] ABSTRACT

A method of operating a system for jetting phase change ink by effecting a solid-to-liquid phase transition of the ink by elevating its temperature, ejecting a first volume of liquid ink towards a target, lowering the temperature of the ejected ink to cause it to solidify after contact with the target and then contacting the first volume of ink with a second volume of similarly jetted ink in a liquid state so that the second volume lies on the first volume. Thereafter, the second volume of ink is caused to undergo a liquid-to-solid transition by lowering its temperature. By this method, the height of printed material is built up.

9 Claims, 2 Drawing Sheets

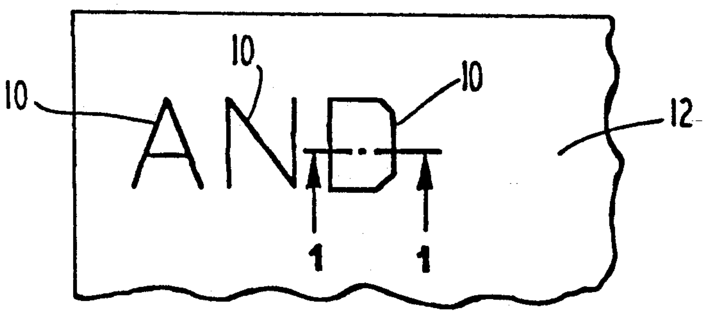
Fig. 6
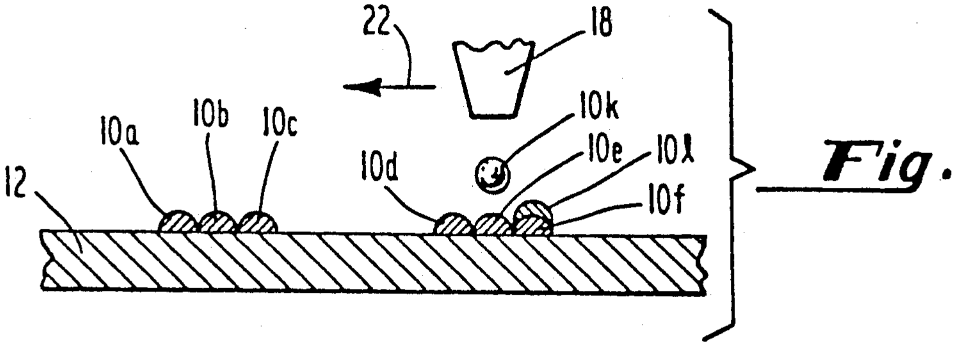
Fig. 5a
Fig. 7
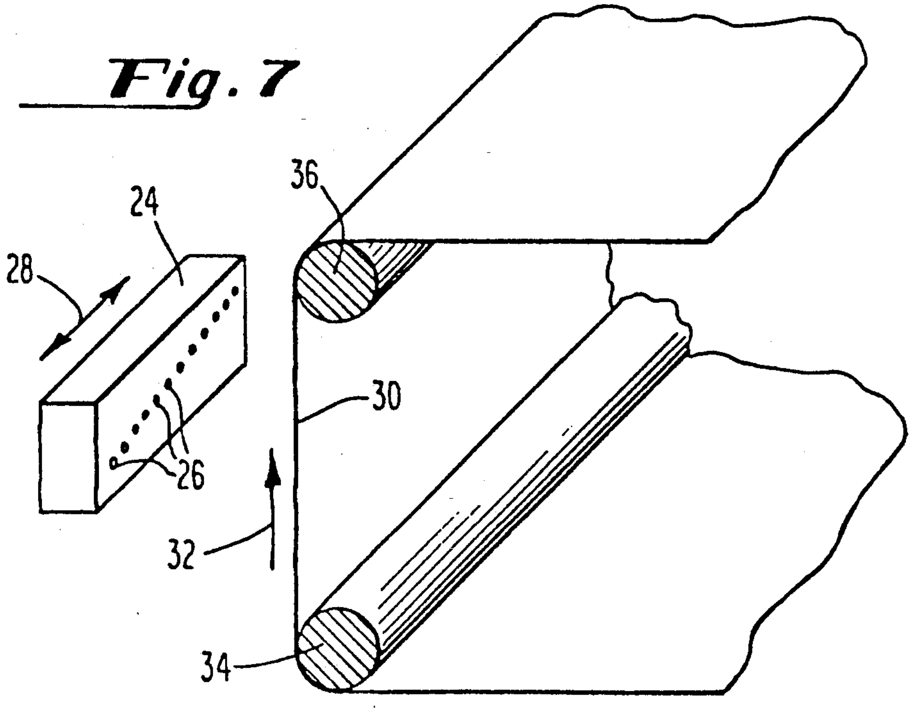

METHOD OF JETTING PHASE CHANGE INK

This is a continuation of U.S. application Ser. No. 07/606,732 filed on Oct. 31, 1990 and now abandoned, itself a division of U.S. application Ser. No. 07/131,318 filed on Dec. 8, 1987, now U.S. Pat. No. 4,992,806 which issued on Feb. 12, 1991, which was itself a continuation of U.S. application Ser. No. 06/830,345 filed on Jan. 17, 1986 and now abandoned.

BACKGROUND OF THE INVENTION

This invention relates to the jetting of ink and, more particularly, the jetting of phase change ink.

The use of phase change ink is particularly desirable since it produces high quality print with a high degree of resolution, i.e., good edge definition and contrast.

U.S. Pat. No. 4,930,369, assigned to the assignee of this invention, discloses a hot-melt or phase change ink. The ink is elevated in temperature as it leaves the jet so as to be in the liquid state. On or shortly after contact with the target, the ink solidifies or freezes on the target. Typically, the dot of ink formed by a droplet of phase change ink protrudes from the target such that the dot may be readily discerned by touch with very little spreading of the dot on the surface of the target. Moreover, because of the substantially instant freezing of the droplet on the target, actual penetration of the droplet into the target, which may comprise paper, is minimized, at least as compared with other ink jet inks which are not of the phase change type.

SUMMARY OF THE INVENTION

It is a primary object of this invention to provide a method for ink jetting droplets such that one droplet may be applied on top of another droplet while still obtaining good resolution.

It is a related object of this invention to provide a method for ink jet printing which achieves embossed printing.

In accordance with these and other objects of the invention, phase change ink capable of undergoing a thermally-reversible liquid-to-solid transition is jetted in the following manner. The temperature of the ink is elevated so as to effect a solid-to-liquid phase transition and a first volume of ink is ejected in the liquid state toward a target.

After contacting the target with the first volume, the temperature of the ink is lowered so as to effect a liquid-to-solid phase transition. A second volume of ink is then ejected in the liquid state toward the target. The second volume of ink contacts the first volume of ink such that the second volume is at least partially superimposed on the first volume. The temperature of the second volume of ink is lowered so as to effect a liquid-to-solid phase transition after contact with the first volume.

In accordance with this invention, the area of the target covered by the first volume remains substantially constant before and after being contacted by the second volume. Preferably, the second volume of ink is in substantial registration with the first volume of ink.

In a particularly preferred embodiment of the invention, a scanning motion is created between the ink jetting means and the target. One series of underlying volumes of ink in the liquid state are then ejected toward the target and contact the target in a series of mutually displaced target positions. The temperature of the ink in the underlying volumes is then lowered after contact with the target. Another series of overlying volumes of ink in the liquid state are then ejected toward a target. The overlying volumes of ink respectively contact the underlying volumes of ink in the mutually displaced target positions and the temperature of the overlying volumes of ink is lowered so as to effect a liquid-to-solid transition.

Preferably, the volumes of ink are jetted or ejected from a plurality of ink jets. In this manner, embossed alpha-numeric characters may be printed with a high degree of efficiency.

BRIEF DESCRIPTION OF THE DRAWINGS

FIGS. 2, 3, 4, 5 and 5*c* disclose cross-sectional views of different steps in the method of depositing the overlying or superimposed droplets of phase change ink on the target to achieve the results is shown in FIG. 1;

FIG. 6 is a planned view of the target with alphanumeric characters where a cross-sectional view of FIG. 1 is taken along line 1—1 of FIG. 1;

FIG. 5*a* discloses a step comparable to the step depicted in FIG. 5 wherein the scanning motion of the ink jet relative to the target is reversed relative to that shown in FIG. 5; and FIG. 7 is a perspective view of an ink jet matrix juxtaposed to a moving target which may be employed in depositing phase change ink in accordance with the principles of this invention.

DETAILED DESCRIPTION OF PREFERRED EMBODIMENTS

Figure 1:
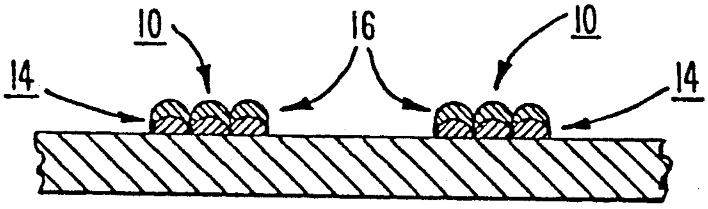
FIG. 1 discloses a target or substrate carrying layers or superimposed volumes or droplets of phase change ink in cross-section.

Referring to FIG. 1, the droplets or individual volume of phase change ink have been deposited on target 12. Phase change ink, sometimes referred to as hot-melt ink, may be of the type disclosed in U.S. Pat. No. 4,390,369. Target 12 may comprise paper or a non-fibrous material such as, for example, plastic.

As shown in FIG. 1, an underlying layer 14 of droplets or volumes of ink is applied to the target 12. An overlying layer 16 of droplets or volumes is applied over the underlying layer 14. By utilizing this superposition of droplets or volumes on top of other droplets or volumes, a raised effect is achieved on the target which can create an embossed alpha-numerical printing of characters as shown in FIG. 6. The application of the volumes of ink 10 to the target 12 as shown in FIGS. 1 and 6 will now be described with reference to FIGS. 2 through 5.

Figure 2:
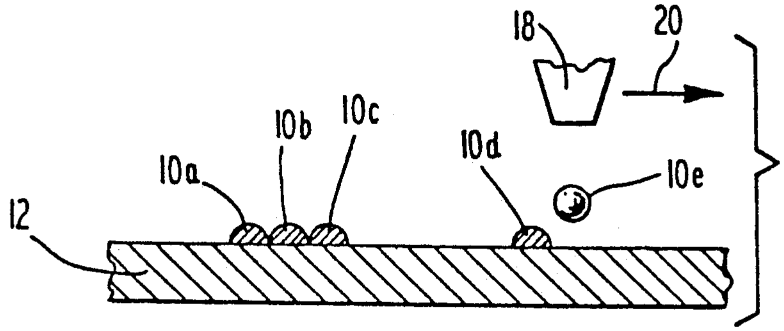

As shown in FIG. 2, an ink jet 18 is juxtaposed to the target 12 where the jet 18 is capable of a scanning motion relative to the target as depicted by the arrow 20. In FIG. 2, a series of underlying ink volumes, partially forming the layer 14, are in the process of being applied to the target 12. As shown, volumes 10*a*, 10*b*, 10*c*, and 10*d* have been deposited on the target 12 and the temperature of the droplets, which was sufficiently elevated upon ejection so that the ink was in the liquid state, has been lowered so as to undergo a liquid-to-solid phase change. In FIG. 2, the cross-hatching is utilized to indicate this liquid-to-solid phase change. As is also shown in FIG. 2, a droplet or volume 10*e*, which is in the liquid state, is traveling toward the target 12.

Figure 3:
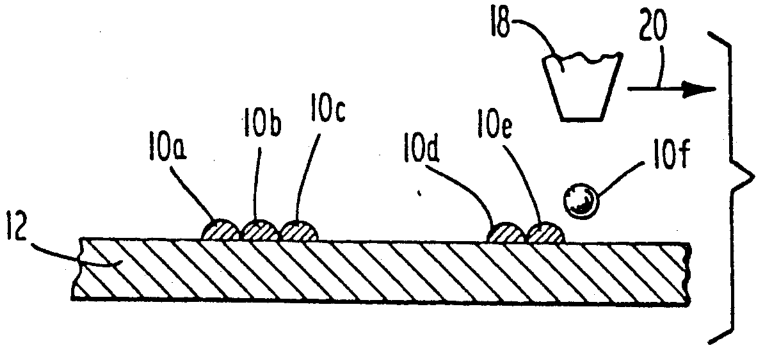

In FIG. 3, the ink jet 18 has advanced to the next position. The droplet or volume 10*e* has solidified, i.e., undergone a liquid-to-solid phase transition. Yet another liquid droplet or volume 10*f* is approaching the target 12.

Figure 4:
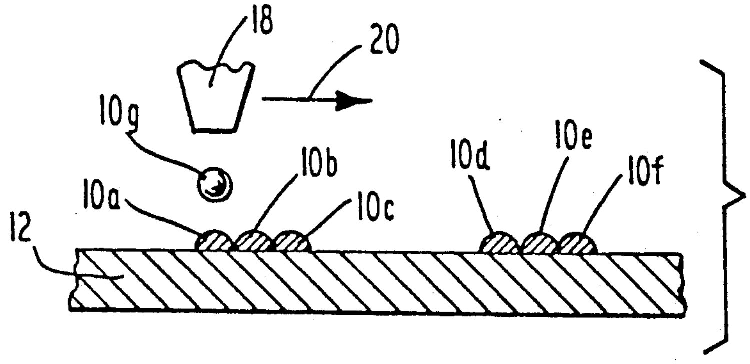

In FIG. 4, all of the droplets 10*a* through 10*f* of the underlying layer 14 have undergone a liquid-to-solid phase change on the target 12. The ink jet 18 has been returned to a position such that a liquid droplet 10*g* is being projected toward the target position covered by the solidified droplet 10*a*.

Figure 5:
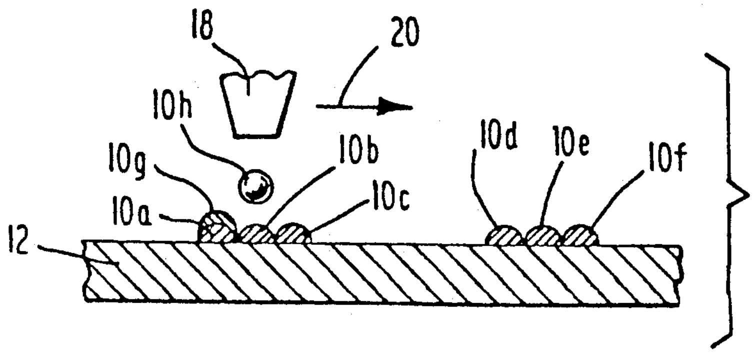

In FIG. 5, the droplet 10*g* has contacted the droplet 10*a* and solidified so as to form part of the overlying series or layer of droplets. Another liquid droplet 10*h* is being projected to the position on the target 12 covered by the volume 10*b*. As the scanning indicated by the arrow 20 of FIG. 5 continues, the overlying series or layer 16 shown in FIG. 1 is completed. This process is continued until the entire alpha-numeric characters forming the word "AND" shown in FIG. 6 is achieved.

As shown in FIG. 1, the volumes or droplets of ink in the overlying series or layer 16 are in substantial registration with the volumes or droplets of ink forming the underlying series or layer 14. However, this need not be the case. As is also shown in FIG. 1, the volumes or droplets 10 are depicted as separate and distanct. In actuality, the droplets or volumes will merge. However, due to the nature of the phase change ink, a high degree of resolution is achieved, i.e., there is little or no spreading of the ink volumes 10 on the target 12 in either the underlying series or layer 14 on the overlying series or layer 16.

It will be appreciated that the steps shown in FIGS. 2 through 5 may be continued so as to apply at least one additional layer of ink volumes to achieve an even further embossed effect.

In the embodiment shown in FIGS. 2 through 5, the scanning motion of the ink jet 18 relative to the target 12 is always in the same direction. As shown in FIG. 5*a*, the overlying volumes of ink are being applied with a scanning motion depicted by the arrow 22 which is in the opposite direction. More specifically, and as shown in FIG. 5*a*, the droplet 10*a* overlying the droplet 10*f* is applied as the jet 18 moves in the direction depicted by the arrow 22. Although this raises the possibility that the volume of ink 10 will be applied shortly after the application the underlying volume of ink 10, the liquid-to-solid phase transition occurs sufficiently rapidly so as not to present a problem.

It will of course be appreciated that, in the interest of efficient and rapid printing, a plurality of ink jets of the type previously described may be employed. More specifically, an ink jet matrix may be utilized as depicted in FIG. 7 so as to project a series of underlying volumes from the matrix and then projecting a series of overlying volumes in mutually displaced target positions. As shown there, an ink jet head 24 comprises a series of orifices 26, each of which is associated with an individual ink jet. The head 24 is scanned in both directions depicted by the arrow 28 relative to moving paper 30 depicted by arrow 32. As shown, the paper 30 is advanced by a suitable transport system depicted by rollers 34 and 36. The head 24 may be of the type disclosed in U.S. Pat. No. 4,459,601, which is assigned to the assignee of this invention and incorporated herein by reference.

Details for a particularly suitable phase change ink are shown in U.S. Pat. No. 4,390,369, incorporated herein by reference.

Although a particular embodiment of the invention has been shown and described and various modifications suggested, other modifications and embodiments will occur to those of ordinary skill in the art which will fall within the true spirit and scope of the invention as set forth in the appended claims.

I claim:

1. A method of operating a system for jetting ink capable of undergoing a thermally-reversible liquid-to-solid phase transition, the method comprising the following steps:

elevating the temperature of the ink so as to effect a solid-to-liquid phase transition;

ejecting a first volume of ink in the liquid state toward a target;

contacting the target with said first volume;

lowering the temperature of said first volume of ink so as to effect a liquid-to-solid phase transition after contact with said target;

ejecting a second volume of ink in the liquid state toward the target;

contacting said first volume of ink with said second volume of ink such that said second volume of ink is at least partially superimposed on the first volume of ink; and lowering the temperature of the ink of said second volume so as to effect a liquid-to-solid phase transition after contact with said first volume.

2. The method of claim 1 wherein the area of the target covered by said first volume of ink remains substantially constant before and after being contacted by said second volume of ink.

3. The method of claim 1 wherein said second volume of ink is in substantial registration with said first volume of ink.

4. A method of printing with an ink jet means be jetting an ink capable of undergoing a thermally-reversible liquid-to-solid phase transition, the method comprising the following steps:

creating a relative scanning motion between said ink jet means and said target;

elevating the temperature of the ink so as to effect a solid-to-liquid phase transition;

ejecting one series of underlying volumes of ink in the liquid state toward a target;

contacting the target with said underlying volumes of ink in a series of mutually displaced target positions;

lowering the temperature of the ink so as to effect a liquid-to-solid phase transition after contact of said underlying volumes with said target;

ejecting another series of overlying volumes of ink in the liquid state toward a target;

contacting said underlying volumes with said overlying volumes of ink; and lowering the temperature of the ink so as to effect a liquid-to-solid phase transition after contact of said overlying volumes with said underlying volumes.

5. The method of claim 4 wherein the area of target covered by said underlying volumes remains substantially constant before and after being contacted by said overlying volumes.

6. The method of claim 4 wherein said underlying volumes of said one series and said overlying volumes of said other series are in substantially registration.

7. The method of claim 4 wherein said series of volumes form alpha-numeric characters.

8. The method of claim 4 wherein said series of volumes are ejected from a plurality of ink jets in said ink jet means.

9. A method of operating a system for jetting an ink capable of undergoing a thermally-reversible liquid-to-solid transition, the method comprising the following steps:

elevating the temperature of the ink so as to place the ink in a liquid state; and causing a print head to effect multiple scanning passes of a target surface at the location of a plurality of lines of print while ejecting the ink in the liquid state in order to form lines of printed material and to build up the height of each line of printed material.

* * * * *